US010875992B2

(12) United States Patent
Wu et al.

(10) Patent No.: US 10,875,992 B2
(45) Date of Patent: Dec. 29, 2020

(54) THERMOPLASTIC POLYOLEFIN BLENDS HAVING IMPROVED LOW TEMPERATURE IMPACT PERFORMANCE

(71) Applicant: Dow Global Technologies LLC, Midland, MI (US)

(72) Inventors: Hang Wu, Shanghai (CN); Wei Li, Shanghai (CN); Yushan Hu, Pearland, TX (US); Jeffrey C. Munro, Bellaire, TX (US); James Hemphill, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 147 days.

(21) Appl. No.: 16/306,114

(22) PCT Filed: May 31, 2016

(86) PCT No.: PCT/CN2016/084005
§ 371 (c)(1),
(2) Date: Nov. 30, 2018

(87) PCT Pub. No.: WO2017/206044
PCT Pub. Date: Dec. 7, 2017

(65) Prior Publication Data
US 2019/0136026 A1 May 9, 2019

(51) Int. Cl.
*C08L 23/12* (2006.01)
*C08L 23/14* (2006.01)
*C08L 23/16* (2006.01)
*C08K 3/34* (2006.01)
*C08L 23/08* (2006.01)

(52) U.S. Cl.
CPC ............... *C08L 23/12* (2013.01); *C08K 3/34* (2013.01); *C08L 23/0815* (2013.01); *C08L 23/16* (2013.01); *C08L 2205/025* (2013.01); *C08L 2205/03* (2013.01); *C08L 2205/035* (2013.01); *C08L 2207/02* (2013.01); *C08L 2207/062* (2013.01); *C08L 2207/066* (2013.01)

(58) Field of Classification Search
None
See application file for complete search history.

(56) References Cited

U.S. PATENT DOCUMENTS

| | | | |
|---|---|---|---|
| 3,251,905 A | 5/1966 | Zelinski et al. |
| 3,265,765 A | 8/1966 | Holden et al. |
| 3,390,207 A | 6/1968 | Moss et al. |
| 3,598,887 A | 8/1971 | Darcey et al. |
| 3,639,521 A | 2/1972 | Hsieh |
| 4,208,356 A | 6/1980 | Fukawa et al. |
| 4,219,627 A | 8/1980 | Halasa et al. |
| 6,028,145 A | 2/2000 | Niebergall et al. |
| 6,372,847 B1 | 4/2002 | Wouters |
| 6,407,171 B1 | 6/2002 | Agarwal et al. |
| 7,608,668 B2 | 10/2009 | Li Pi Shan et al. |
| 7,741,397 B2 | 6/2010 | Liang et al. |
| 7,858,706 B2 | 12/2010 | Arriola et al. |
| 7,863,379 B2 | 1/2011 | Kapur et al. |
| 7,893,166 B2 | 2/2011 | Shan et al. |
| 7,947,793 B2 | 5/2011 | Marchand et al. |
| 8,716,400 B2 | 5/2014 | Carnahan et al. |
| 8,921,491 B2 | 12/2014 | Walton et al. |
| 2006/0199930 A1 | 9/2006 | Li Pi Shan et al. |
| 2009/0088510 A1 | 4/2009 | Jones, III et al. |
| 2010/0113698 A1 | 5/2010 | Walton et al. |
| 2011/0060085 A1 | 3/2011 | Gahleitner et al. |
| 2011/0118401 A1 | 5/2011 | Kim et al. |
| 2013/0137826 A1* | 5/2013 | Urakawa .............. C08L 23/10 525/222 |
| 2015/0057408 A1 | 2/2015 | Eckmayr et al. |
| 2015/0148437 A1 | 5/2015 | Langenfelder et al. |
| 2015/0191590 A1 | 7/2015 | Mikami et al. |
| 2016/0024287 A1 | 1/2016 | Rohrmann et al. |

FOREIGN PATENT DOCUMENTS

| | | | |
|---|---|---|---|
| CN | 102775718 | 11/2012 | |
| CN | 104109330 | 10/2014 | |
| CN | 104640747 | 5/2015 | |
| CN | 104974416 | 10/2015 | |
| EP | 0844280 A1 * | 5/1998 | ............ C08L 23/142 |
| EP | 2650329 | 10/2013 | |
| JP | 11080493 | 3/1999 | |
| JP | 200021238 | 1/2000 | |
| JP | 2014077128 | 5/2014 | |
| WO | 2006/070179 | 7/2006 | |
| WO | 2008/009432 | 1/2008 | |
| WO | 2009/097525 | 8/2009 | |
| WO | 2009/097529 | 8/2009 | |
| WO | 2009/097532 | 8/2009 | |
| WO | 2009/097535 | 8/2009 | |
| WO | 2009/097560 | 8/2009 | |
| WO | 2009/097565 | 8/2009 | |
| WO | 2012010482 | 1/2012 | |
| WO | 2014036292 A1 | 3/2014 | |
| WO | 2015057423 A1 | 4/2015 | |
| WO | 2016005301 | 1/2016 | |
| WO | 2017210081 A1 | 12/2017 | |

OTHER PUBLICATIONS

Potemkin, Physical Review E, 1998, vol. 57, No. 6, p. 6902-6912.

(Continued)

*Primary Examiner* — Michael J Feely

(57) ABSTRACT

A composition comprising (A) from 30 wt % to 70 wt % of a propylene component including at least one propylene based polymer having a propylene content of at least 70.0 wt %, based on the total weight of the propylene based polymer, and a melt flow rate from 1.0 g/10 min to 100.0 g/10 min (ASTM D-1238 at 230° C., 2.16 kg); (B) from 1 wt % to 20 wt % of an ethylene component including at least one ethylene based polymer having an ethylene content of at least 85.0 wt %, based on the total weight of the ethylene based polymer, and a melt index from 0.1 g/10 min to 50.0 g/10 min (ASTM D-1238 at 190° C., 2.16 kg); (C) from 1 wt % to 40 wt % of an olefin block copolymer; and at least one of (D) from 1 wt % to 40 wt % of a polyolefin elastomer and (E) from 1 wt % to 30 wt % of a filler.

9 Claims, No Drawings

(56) References Cited

OTHER PUBLICATIONS

Dobrynin, J. Chem. Phys., 1997, vol. 107, No. 21, p. 9234-9238.
PCT/CN2016/084005, International Search Report and Written Opinion dated Feb. 17, 2017.
PCT/CN2016/084005, International Preliminary Report on Patentability dated Dec. 4, 2018.
PCT/US2017/034214, International Search Report and Written Opinion dated Sep. 25, 2017.

\* cited by examiner

THERMOPLASTIC POLYOLEFIN BLENDS HAVING IMPROVED LOW TEMPERATURE IMPACT PERFORMANCE

FIELD

Embodiments relate to thermoplastic polyolefin blends that include a propylene component, an ethylene component, an olefin block copolymer, and at least one of a polyolefin elastomer and a filler.

INTRODUCTION

Thermoplastic polyolefin (TPO) formulations are widely used in automotive applications, such as bumper fascia, instrument panels, door trims, airbag covers, etc. Polymer blends are highly competitive for TPO applications in terms of both cost and performance. Such blends include, for example, polypropylene impact copolymers (PP ICP), which provide low temperature impact performance. Use of ethylene based materials to replace part of the polypropylene could provide a solution to better manage the balance of cost and physical properties of the blends. However, a barrier to such a solution is the incompatibility between polyethylene and polypropylene which results in immiscible blends with poor low temperature impact performance. Accordingly, a need exists for compatibilized polyolefin blends that demonstrate improved impact resistance, especially at low temperatures, in such formulations where polypropylene is replaced with polyethylene.

SUMMARY

Embodiments may be realized by providing a composition comprising:
(A) from 30 wt % to 70 wt % of a propylene component including at least one propylene based polymer having a propylene content of at least 70.0 wt %, based on the total weight of the propylene based polymer, and a melt flow rate from 1.0 g/10 min to 100.0 g/10 min (ASTM D-1238 at 230° C., 2.16 kg);
(B) from 1 wt % to 20 wt % of an ethylene component including at least one ethylene based polymer having an ethylene content of at least 85.0 wt %, based on the total weight of the ethylene based polymer, and a melt index from 0.1 g/10 min to 50.0 g/10 min (ASTM D-1238 at 190° C., 2.16 kg);
(C) from 1 wt % to 40 wt % of an olefin block copolymer; and
at least one of (D) from 1 wt % to 40 wt % of a polyolefin elastomer and (E) from 1 wt % to 30 wt % of a filler.

DETAILED DESCRIPTION

Terms

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As used with respect to a chemical compound, unless specifically indicated otherwise, the singular includes all isomeric forms and vice versa.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

"Composition" and like terms mean a mixture or blend of two or more components. "Blend," "polymer blend," and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer embraces the term homopolymer, usually employed to refer to polymers prepared from only one type of monomer, and the term interpolymer and copolymer as defined below. It also encompasses all forms of interpolymers, e.g., random, block, homogeneous, heterogeneous, etc.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

The terms "ethylene/α-olefin interpolymer" and "ethylene/α-olefin multi-block interpolymer," as used herein, refer to an interpolymer that comprises a polymerized ethylene monomer and at least one α-olefin.

The terms "ethylene/α-olefin copolymer" and "ethylene/α-olefin multi-block copolymer," as used herein, further refer to a copolymer that comprises a polymerized ethylene monomer and an α-olefin as the only two monomer types.

"Units derived from ethylene," "ethylene content," and like terms mean the units of a polymer that formed from the polymerization of ethylene monomers. "Units derived from α-olefin," "alpha-olefin content," "α-olefin content," and like terms mean the units of a polymer that formed from the polymerization of specific α-olefin monomers, in particular at least one of a $C_{3-10}$ α-olefin. "Units derived from propylene," "propylene content," and like terms mean the units of a polymer that formed from the polymerization of propylene monomers.

"Propylene based polymer," and like terms mean a polymer that comprises a majority weight percent polymerized propylene monomer, also referred to as units derived from propylene (based on the total amount of polymerizable monomers), and optionally comprises at least one polymerized comonomer different from propylene (such as at least one selected from a $C_2$ and $C_{4-10}$ α olefin) so as to form a propylene-based interpolymer. For example, when the propylene-based polymer is a copolymer, the propylene content is greater than 50 wt %, based on the total weight of the copolymer.

"Ethylene based polymer" and like terms mean a polymer that comprises a majority weight percent polymerized ethylene monomer, also referred to as units derived from ethylene (based on the total weight of polymerizable monomers), and optionally may comprise at least one polymerized comonomer different from ethylene (such as at least one selected from a $C_{3-10}$ α olefin) so as to form an ethylene-based interpolymer. For example, when the ethylene-based polymer is a copolymer, the amount of ethylene is greater than 85 wt %, based on the total weight to the copolymer.

The term "polyethylene" includes homopolymers of ethylene and copolymers of ethylene and one or more $C_{3-8}$ α-olefins in which ethylene comprises at least 50 mole percent. The term "polypropylene" includes homopolymers of propylene such as isotactic polypropylene, syndiotactic polypropylene, and copolymers of propylene and one or more $C_{2,4-8}$ α-olefins in which propylene comprises at least 50 mole percent. Preferably, a plurality of the polymerized monomer units of at least one block or segment in the polymer (a crystalline block) comprise propylene, preferably at least 90 mole percent, more preferably at least 93 mole percent, and most preferably at least 95 mole percent. A polymer made primarily from a different α-olefin, such as 4-methyl-1-pentene would be named similarly.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline ethylene polymers typically have, but are not limited to, densities of 0.89 g/cc to 0.97 g/cc and melting points of 75° C. to 140° C. Crystalline propylene polymers may have, but are not limited to, densities of 0.88 g/cc to 0.91 g/cc and melting points of 100° C. to 170° C.

The term "amorphous" refers to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads.

Propylene Component

The composition includes from 30 wt % to 70 wt % (e.g., from 35 wt % to 70 wt %, from 40 wt % to 70 wt %, from 45 wt % to 65 wt %, etc.) of a propylene component. The propylene component includes one or more propylene based polymers having a propylene content of at least 70.0 wt %, based on the total weight of the propylene based polymer. The one or more propylene based polymer has a melt flow rate from 0.1 g/10 min to 500.0 g/10 min, according to ASTM D-1238 or ISO 1133 at 230° C., 2.16 kg (e.g., from 1 g/10 min to 100.0 g/10 min, from 5 g/10 min to 75 g/10 min, from 10 g/10 min to 50 g/10 min, etc.). The propylene based polymer may have a density, in accordance with ASTM D792 or ISO 1183, from 0.850 g/cm³ to 0.950 g/cm³ (e.g., from 0.860 g/cc to 0.940 g/cc, from 0.875 g/cc to 0.925 g/cc, from 0.880 g/cc to 0.910 g/cc, etc.). The propylene based polymer may consist of heterogeneous polypropylene or homogeneous polypropylene.

Each of the one of more propylene based polymers may be a propylene homopolymer, propylene based interpolymers, a random copolymer polypropylene (RCPP), an impact copolymer polypropylene (e.g., homopolymer propylene modified with at least one elastomeric impact modifier) (ICPP), a high impact polypropylene (HIPP), a high melt strength polypropylene (HMS-PP), an isotactic polypropylene (iPP), a syndiotactic polypropylene (sPP), or a combination thereof. In exemplary embodiments, the one or more propylene based polymers may be in the isotactic form of homopolymer polypropylene, although other forms of polypropylene may be used (e.g., syndiotactic or atactic). In exemplary embodiments, the one or more propylene based polymers may be a polypropylene homopolymer or an impact copolymer polypropylene.

The one or more propylene-based polymers are formed without the use of a chain shuttling agent, as discussed below with respect to the block composites. Exemplary comonomers for polymerizing with propylene include ethylene, 1-butene, 1 pentene, 1-hexene, 1-heptene, 1-octene, 1-nonene, 1-decease, 1-unidecene, 1 dodecene, as well as 4-methyl-1-pentene, 4-methyl-1-hexene, 5-methyl-1-hexene, vinylcyclohexane, and styrene. Exemplary comonomers include ethylene, 1-butene, 1-hexene, and 1-octene. Exemplary propylene based interpolymers include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene. Optionally, the propylene-based polymer include a monomer having at least two double bonds such as dienes or trienes. Other unsaturated comonomers include, e.g., 1,3-pentadiene, norbornadiene, and dicyclopentadiene; C8-40 vinyl aromatic compounds including styrene, o-, m-, and p-methylstyrene, divinylbenzene, vinylbiphenyl, vinylnapthalene; and halogen-substituted C8-40 vinyl aromatic compounds such as chlorostyrene and fluorostyrene.

Exemplary propylene-based polymers are formed by means within the skill in the art, for example, using single site catalysts (metallocene or constrained geometry) or Ziegler natta catalysts.

An exemplary discussion of various polypropylene polymers is contained in Modern Plastics Encyclopedia/89, mid October 1988 Issue, Volume 65, Number 11, pp. 86-92, the entire disclosure of which is incorporated herein by reference. Examples of such propylene based polymers include VERSIFY™ (available from The Dow Chemical Company), Vistamaxx™ (available from Exxon Mobil), INSPIRE™ (available from Braskem), and Pro-Fax (available from LyondellBasell).

In exemplary embodiments, the propylene-based polymer may be a propylene-alpha-olefin copolymer, which is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93.

Similarly as discussed with respect to the ethylene-based polymers, the propylene-based polymers may contain LCB. For example, the propylene-based polymer may contain an average of at least 0.001, an average of at least 0.005 and/or an average of at least 0.01, long chain branches/1000 total carbons. The term long chain branch, as used herein, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length.

Further parameters of the propylene-based polymers (e.g., molecular weight, molecular weight distribution, melting temperature, etc.) will be known by those of ordinary skill in the art based on the present disclosures and can be determined by known methods in the polymer art.

Ethylene Component

The composition includes from 1 wt % to 20 wt % (e.g., 5 wt % to 20 wt %, 10 wt % to 20 wt %, 10 wt % to 15 wt % etc.) of an ethylene component. The ethylene component includes one or more ethylene based polymers having an ethylene content of at least 85.0 wt %, based on the total weight of the ethylene based polymer. The one or more ethylene based polymers have a melt index from 0.1 g/10 min to 100.0 g/10 min (e.g., from 0.3 g/10 min to 80.0 g/10 min, 0.3 g/10 min to 50.0 g/10 min, 0.3 g/10 min to 30.0 g/10 min, 0.3 g/10 min to 20.0 g/10 min, 0.5 g/10 min to 10.0 g/10 min, etc.), according to ASTM D-1238 or ISO 1133 at 190° C., 2.16 kg. The ethylene based polymers have a density from 0.900 g/cm$^3$ to 0.980 g/cm$^3$ (e.g., 0.925 g/cm$^3$ to 0.975 g/cm$^3$, 0.935 g/cm$^3$ to 0.970 g/cm$^3$, 0.950 g/cm$^3$ to 0.970 g/cm$^3$, etc.) in accordance with ASTM D792 or ISO 1183.

The ethylene component may include high density polyethylene (HDPE), medium density polyethylene (MDPE), linear low density polyethylene (LLDPE), or combinations thereof. Exemplary other ethylene based polymers include ultralow density polyethylene (ULDPE), low density polyethylene (LDPE), high melt strength high density polyethylene (HMS-HDPE), ultrahigh density polyethylene (UHDPE), and combinations thereof. In exemplary embodiments, the ethylene component includes at least 50 wt %, 60 wt %, 70 wt %, 80 wt %, 90 wt %, 95 wt %, 99 wt %, etc., and/or includes 100 wt % of HDPE type ethylene based polymers, based on the total amount of one or more ethylene based polymers in the ethylene component.

The number average molecular weight (Mw) of the ethylene based polymers in the ethylene component may be at least 5,000, at least 10,000, at least 15,000, at least 20,000, at least 25,000, and/or at least 30,000 grams per mole (g/mol). The molecular weight distribution or polydispersity or Mw/Mn of these polymers may be between 1 and 8. Weight average molecular weight (Mw) and number average molecular weight (Mn) are well known in the polymer art and can be determined by know methods. Further parameters of the ethylene-based polymers (e.g., melting temperature, etc.) will be known by those of ordinary skill in the art based on the present disclosures and can be determined by known methods in the polymer art.

Exemplary ethylene based polymers may include an ethylene/alpha-olefin interpolymer. The ethylene-based polymers are formed without the use of a chain shuttling agent, as discussed below with respect to the crystalline block composite. Such interpolymers include polymers polymerized from at least two different monomers. They include, e.g., copolymers, terpolymers and tetrapolymers. Exemplary, interpolymers are prepared by polymerizing ethylene with at least one comonomer, such as an alpha-olefin ($\alpha$-olefin) of 3 to 20 carbon atoms ($C_3$-$C_{20}$), 4 to 20 carbon atoms ($C_4$-$C_{20}$), 4 to 12 carbon atoms ($C_4$-$C_{12}$), 4 to 10 carbon atoms ($C_4$-$C_{10}$), and/or 4 to 8 carbon atoms ($C_4$-$C_8$). The alpha-olefins include, but are not limited to, 1-butene, 1-pentene, 1-hexene, 4-methyl-1-pentene, 1-heptene, and 1-octene. In embodiments, alpha-olefins such as 1-butene, 1-pentene, 1-hexene, 4-methyl-1-pentene, 1-heptene, and/or 1-octene are used. The alpha-olefin may be a $C_4$-$C_8$ alpha-olefin.

Exemplary, interpolymers include ethylene/propylene (EP), ethylene/butene (EB) copolymers, ethylene/hexene (EH), ethylene/octene (EO) copolymers, ethylene/alpha-olefin/diene modified (EAODM) interpolymers such as ethylene/propylene/diene modified (EPDM) interpolymers, and ethylene/propylene/octene terpolymers.

In exemplary embodiments, the ethylene based polymers may be branched and/or unbranched interpolymers. The presence or absence of branching in the ethylene based interpolymers, and if branching is present, the amount of branching, can vary widely, and may depend on the desired processing conditions and the desired polymer properties. Exemplary types of long chain branching (LCB) in the interpolymers include T-type branching and H-type branching.

Olefin Block Copolymer

The composition includes from 1 wt % to 40 wt % of an olefin block copolymer. The term "olefin block copolymer" or "OBC" means (and is interchangeable with) an ethylene/$\alpha$-olefin interpolymer and includes ethylene and one or more copolymerizable $\alpha$-olefin comonomer in polymerized form, characterized by multiple blocks or segments of two or more polymerized monomer units differing in chemical or physical properties. When referring to amounts of "ethylene" or "comonomer" in the interpolymer, it is understood that this means polymerized units thereof. In some embodiments, the ethylene/$\alpha$-olefin interpolymer is an ethylene/$\alpha$-olefin multi-block interpolymer. In further embodiments, the ethylene/$\alpha$-olefin interpolymer is an ethylene/$\alpha$-olefin multi-block copolymer that can be represented by the following formula:

$$(AB)_n,$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows. AAA-AA-BBB-BB.

In certain embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an $\alpha$-olefin having 3 or more carbon atoms. In some embodiments, the olefin block copolymer may comprise 50 mol % to 90 mol % ethylene, preferably 60 mol % to 85 mol %, more preferably 70 mol % to 85 mol %. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin block copolymer includes various amounts of "hard" and "soft" segments. "Hard" segments are blocks of polymerized units in which ethylene is present in an amount greater than 94 weight percent, or greater than 98 weight percent based on the weight of the polymer, up to 100 weight percent. In other words, the comonomer content (content of monomers other than ethylene) in the hard segments is less than 6 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a multi-block or segmented polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

When produced in a continuous process, embodiments of the OBC may possess a PDI ranging from 1.7 to 8; or from 1.7 to 3.5; or from 1.7 to 2.5; and from 1.8 to 2.5; or from 1.8 to 2.1. When produced in a batch or semi-batch process, the OBC possesses PDI from 1.0 to 3.5, or from 1.3 to 3, or from 1.4 to 2.5, or from 1.4 to 2.

Because the respective distinguishable segments or blocks formed from two or more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In an embodiment, the quantity of extractable polymer using either a dialkyl ether or an alkane solvent is less than 10, or less than 7, or less than 5, or less than 2, percent of the total polymer weight.

In addition, the OBC disclosed herein possesses a PDI fitting a Schultz-Flory distribution rather than a Poisson distribution. The present OBC is produced by the polymerization process described in U.S. Pat. Nos. 7,858,706 and 7,608,668 which results in a product having both a polydisperse block distribution as well as a polydisperse distribution of block sizes. This results in the formation of OBC product having distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238. In an embodiment, the present olefin block copolymer possesses a most probable distribution of block lengths. In an embodiment, the olefin block copolymer is defined as having:

(A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from 1.7 to 3.5, and is characterized by a heat of fusion, $\Delta H$ in J/g, and a delta quantity, $\Delta T$, in degrees Celsius defined as the temperature difference between the tallest DSC peak and the tallest Crystallization Analysis Fractionation ("CRYSTAF") peak, wherein the numerical values of $\Delta T$ and $\Delta H$ have the following relationships:

$$\Delta T > -0.1299\Delta H + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase: Re>1481-1629(d); and/or (D) a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G' (25° C.), and a storage modulus at 100° C., G'(100° C.), wherein the ratio of G' (25° C.) to G' (100° C.) is in the range of 1:1 to 9:1.

The olefin block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3. It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

The ethylene/α-olefin multi-block interpolymer, and further copolymer, may comprise any one of properties (A) through (G), or may comprises a combination of two or more of (A) through (G).

Another type of ethylene/α-olefin block interpolymers that may be used are those referred to as "mesophase separated". These mesodomains can take the form of spheres, cylinders, lamellae, or other morphologies known for block copolymers. The narrowest dimension of a domain, such as perpendicular to the plane of lamellae, is generally greater than about 40 nm in the mesophase separated block copolymers of the instant invention. Examples of these interpolymers may be found in, for example, International Publication Nos. WO/2009/097560, WO/2009/097565, WO/2009/097525, WO/2009/097529, WO/2009/097532, and WO/2009/097535, all of which are herein incorporated by reference.

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decease, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In certain embodiments, the ethylene/α-olefin multi-block interpolymer, and further copolymer, has a density greater than 0.850 g/cc, further greater than 0.860 g/cc, and further greater than 0.865 g/cc. The density may be, for example, from 0.850 g/cc to 0.950 g/cc, from 0.860 g/cc to 0.925 g/cc, and from 0.860 to 0.900 g/cc. Density is measured by the procedure of ASTM D-792.

In certain embodiments, the ethylene/α-olefin multi-block interpolymer, and further copolymer, has a melting point of greater than 90° C., further greater than 100° C. The melting point is measured by Differential Scanning calorimetry (DSC) method described in U.S. Publication 2006/0199930 (WO 2005/090427), incorporated herein by reference.

In certain embodiments, the ethylene/α-olefin multi-block interpolymer, and further copolymer, has a melt index (I2) greater than, or equal to, 0.1 g/10 min, and further greater than, or equal to, 0.5 g/10 min, as determined using ASTM D-1238 or ISO 1133 (190° C., 2.16 kg load).

In certain embodiments, the ethylene/α-olefin multi-block interpolymer, and further copolymer, has a melt index (I2) less than, or equal to, 50 g/10 min, further less than, or equal to, 20 g/10 min, and further less than, or equal to, 10 g/10 min, as determined using ASTM D-1238 or ISO 1133 (190° C., 2.16 kg load).

An ethylene/α-olefin multi-block interpolymer may comprise a combination of two or more embodiments as described herein. An ethylene/α-olefin multi-block copolymer may comprise a combination of two or more embodiments as described herein.

Polyolefin Elastomer

The composition may include from 1 to 40 wt % of a polyolefin elastomer (e.g., from 5 wt % to 35 wt %, from 10 wt % to 30 wt %, etc.). In certain embodiments of the present disclosure, the polyolefin elastomer may be used to toughen the propylene component of the composition. Suitable polyolefin elastomers may be any elastomer with sufficient polypropylene compatibility and sufficiently low enough glass transition temperature to impart impact toughness to the propylene component. In one embodiment, the polyolefin elastomer is a randomly copolymerized ethylene/alpha-olefin copolymer. In a further embodiment, the polyolefin elastomer is an ethylene/alpha-olefin interpolymer.

The ethylene/α-olefin random copolymers used as the toughening elastomer in the embodiments of the invention are preferably copolymers of ethylene with at least one $C_3$-$C_{20}$ α-olefin. Copolymers of ethylene and a $C_3$-$C_{20}$ α-olefin are especially preferred. Non-limiting examples of such copolymers are linear, homogeneously branched copolymers such as EXACT® from ExxonMobil and TAFMER® from Mitsui, and substantially linear, homogeneously branched copolymers such as AFFINITY® and ENGAGE® copolymers from the Dow Chemical Company.

The copolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin copolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decease, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable elastomers that can be made in accordance with embodiments of the invention are elastomers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is octene.

In yet another embodiment, selectively hydrogenated block copolymers can be used as the toughening elastomer including block copolymers of conjugated dienes and vinyl aromatic hydrocarbons which exhibit elastomeric properties and which have 1,2-microstructure contents prior to hydrogenation of from about 7% to about 100%. Such block copolymers may be multiblock copolymers of varying structures containing various ratios of conjugated dienes to vinyl aromatic hydrocarbons including those containing up to about 60 percent by weight of vinyl aromatic hydrocarbon. Thus, multiblock copolymers may be utilized which are linear or radial, symmetric, or asymmetric and which have structures represented by the formulae, A-B, A-B-A, A-B-A-B, B-A, B-A-B, B-A-B-A, $(AB)_{0,1,2}$ ... BA and the like wherein A is a polymer block of a vinyl aromatic hydrocarbon or a conjugated diene/vinyl aromatic hydrocarbon tapered copolymer block and B is a polymer block of a conjugated diene.

The block styrenic copolymers may be produced by any well known ionic block polymerization or copolymerization procedures including the well known sequential addition of monomer techniques, incremental addition of monomer techniques or coupling techniques as illustrated in, for example, U.S. Pat. Nos. 3,251,905, 3,390,207, 3,598,887, and 4,219,627, all of which are incorporated herein by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905, 3,265,765, 3,639,521, and 4,208,356, the disclosures of which are incorporated herein by reference.

In certain embodiments, the polyolefin elastomer of the present disclosure has a density of from 0.850 g/cc to 0.900 g/cc. In certain embodiments, the polyolefin elastomer of the present disclosure has a melt index of from 0.1 g/10 min to 2000 g/10 min, according to ASTM D1238 or ISO 1133 at 190° C./2.16 kg (e.g., from 0.1 g/10 min to 500 g/10 min, from 0.1 g/10 min to 100 g/10 min, from 0.1 g/10 min to 50 g/10 min, from 0.1 g/10 min to 10 g/10 min, etc.).

Further parameters of the polyolefin elastomers (e.g., molecular weight, molecular weight distribution, melting temperature, etc.) will be known by those of ordinary skill in the art based on the present disclosures and can be determined by known methods in the polymer art.

Filler

The polyolefin blend compositions of the present disclosure can optionally include one or more additives and/or fillers. Non-limiting examples of additives and/or fillers include plasticizers, thermal stabilizers, light stabilizers (e.g., UV light stabilizers and absorbers), antioxidants, slip agents, process aids, optical brighteners, antistats, lubricants, catalysts, rheology modifiers, biocides, corrosion inhibitors, dehydrators, organic solvents, colorants (e.g., pigments and dyes), surfactants, demolding additives, mineral oil, antiblocking agents, nucleating agents, flame retardants, reinforcing fillers (e.g., glass, fibers, anti-scratch additives, talc, calcium carbonate, mica, glass fibers, whisker, etc.), processing aids, and combinations thereof. In certain embodiments, the polyolefin blend compositions comprise talc filler. In further embodiments, the polyolefin blend compositions comprise from 1 wt % to 30 wt % of a talc filler (e.g. from 1 wt % to 20 wt %, from 5 wt % to 15 wt %, etc.).

Composition

Without being bound by theory, it is believed that the olefin block copolymer, as disclosed herein, acts as an effective modifier/compatibilizer between PE and PP phases in the TPO compositions of the present disclosure to yield a fine rubber particle dispersion that provides improved low temperature impact properties. The novel compatibilized blends of PP and elastomers offer a wider range of thermodynamically stable compositions with morphologies finer than those achievable with classical blends, resulting in unique combinations of properties, namely a combination of very high impact resistance at temperatures as low as −45° C., a melt flow rate allowing for easy processing in injection molding, a stiffness level suitable for easy demolding of complex injection molded parts, and improved temperature resistance of the final part.

The polyolefin blend composition may be useful for preparing articles using known processes. For example, the compositions may be fabricated into parts, sheets or other article of manufacture, using any extrusion, calendering, blow molding, compression molding, injection molding, or thermoforming processes. The components of the composition may be fed to the process either pre-mixed, or the components may be fed directly into the process equipment, such as a converting extruder, such that the composition is formed therewithin. The compositions may be blended with another polymer, prior to fabrication of an article. Such blending may occur by any of a variety of conventional techniques, one of which is dry blending of pellets of the compositions with pellets of another polymer.

The polyolefin blend compositions may be compounded using, for example, a twin screw extruder, batch mixer, or single screw extruder.

Examples

Approximate conditions, properties, formulations etc., for the preparation of the Examples are provided below.

Test Methods

Density is measured in accordance with ASTM D-792. The result is reported in grams (g) per cubic centimeter, or g/cc.

Melt index (MI) is measured in accordance with ASTM D-1238 (190° C.; 2.16 kg). The result is reported in grams/10 minutes.

Melt flow rate (MFR) is measured in accordance with ASTM D-1238 (230° C.; 2.16 kg).

Izod Impact is measured according to ISO 180. Alternatively, Izod Impact is measured according to ASTM D256.

Tensile Properties, including tensile modulus, tensile yield strength, and tensile strain at break are measured in accordance with ISO 527. Alternatively, tensile properties are measured according to ASTM D638.

Flexural Modulus is measured in accordance with ASTM D790. Alternatively, Flexural Modulus is measured in accordance with ISO 178.

Molecular weight distribution (MWD) is measured using Gel Permeation Chromatography (GPC). In particular, conventional GPC measurements are used to determine the weight-average (Mw) and number-average (Mn) molecular weight of the polymer and to determine the MWD (which is calculated as Mw/Mn). Samples are analyzed with a high-temperature GPC instrument. The method employs the well-known universal calibration method, based on the concept of hydrodynamic volume, and the calibration is performed using narrow polystyrene (PS) standards. The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, 621 (1968)) to derive the following equation:

$$M_{polyethylene} = a * (M_{polystyrene})^b.$$

In this equation, a=0.4316 and b=1.0 (as described in Williams and Ward, J. Polym. Sc., Polym. Let., 6, 621 (1968)). Polyethylene equivalent molecular weight calculations were performed using VISCOTEK TriSEC software Version 3.0.

Gel permeation chromatographic (GPC) system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polypropylene}=0.645(M_{polystyrene})$.

Differential Scanning Calorimetry (DSC) results are determined using a TAI model Q1000 DSC equipped with an RCS cooling accessory and an autosampler. A nitrogen purge gas flow of 50 ml/min is used. The sample is pressed into a thin film and melted in the press at about 190° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −90° C. at 10° C./min cooling rate and held at −90° C. for 3 minutes. The sample is then heated to 180° C. at 10° C./min heating rate. The cooling (Tc) and second heating curves (Tm) are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline. DSC can also be used to measure the soft segment melting temperature, as discussed in WO 2006/101966 A1, which is incorporated herein by reference in its entirety.

$^{13}$C NMR spectroscopy is one of a number of techniques known in the art for measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)), which is incorporated by reference herein in its entirety. The basic procedure for determining the comonomer content of an ethylene/olefin interpolymer involves obtaining a $^{13}$C NMR spectrum under conditions where the intensity of the peaks corresponding to the different carbons in a sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomers. The mole % comonomer can be determined by the ratio of the integrals corresponding to the number of moles of comonomer to the integrals corresponding to the number of moles of all of the monomers in the interpolymer, as described in the aforementioned Randall reference.

The soft segment weight percentage and hard segment weight percentage of an ethylene/olefin interpolymer of the present disclosure is determined by DSC, and mole % comonomer in the soft segment of an ethylene/olefin interpolymer of the present disclosure is determined by $^{13}$C NMR spectroscopy and the methods described in WO 2006/101966 A1, which is incorporated herein by reference in its entirety.

$^{13}$C NMR Analysis: The samples are prepared by adding approximately 2.7 g of a 50/50 mixture of tetrachloroethane-d$^2$/orthodichlorobenzene to 0.2 g sample in a 10 mm NMR tube. The samples are dissolved and homogenized by heating the tube and its contents to 150° C. The data are collected using a JEOL Eclipse™ 400 MHz spectrometer, Bruker 400 MHz spectrometer, or a Varian Unity Plus™ 400 MHz spectrometer, corresponding to a $^{13}$C resonance frequency of 100.5 MHz. The data is acquired using 256 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 120° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Standard CRYSTAF Method: Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer. The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

ATREF: Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

Blend Compositions

The following materials are principally used in the exemplary compositions of the present application:

PP: A polypropylene copolymer having properties including a density of 0.905 g/cc (ISO 1183) and a MFR of 25 grams/10 minutes (ISO 1133 at 230° C./2.16 kg) (available as PPC 9712 from Total Refining & Chemicals).

PE: A high density polyethylene resin having properties including a density of 0.967 g/cc (ASTM D792) and a melt index of 8.3 g/10 minutes (ASTM D1238 at 190° C./2.16 kg) (available as DOW™ HDPE DMDA-8007 from The Dow Chemical Company).

OBC: An olefin block copolymer having properties including a density of 0.8695 g/cc (ASTM D792) and a melt index of 0.5 g/10 minutes (ASTM D1238 at 190° C./2.16 kg). (available as ENGAGE™ XLT 8677 available from The Dow Chemical Company).

POE: An ethylene-octene copolymer having properties including a density of 0.870 g/cc (ASTM D792) and a melt index of 1.0 g/10 minutes (ASTM D1238 at 190° C./2.16 kg) (available as ENGAGE™ 8100 from The Dow Chemical Company).

Talc: Available as Imerys 700 talc.

All blends in Table 1 were compounded via twin screw extrusion (using a Coperion 18 mm extruder) and granulated into small pellets by a side cutter granulator. The granulated compounds were then injection molded as samples for testing.

In particular, Working Examples 1-4 and Comparative Examples A-E are prepared according to the following formulations and are analyzed with respect to the following properties:

TABLE 1

| Materials | | Ex. A | Ex. B | Ex. C | Ex. 1 | Ex. D | Ex. 2 | Ex. 3 | Ex. E | Ex. 4 |
|---|---|---|---|---|---|---|---|---|---|---|
| Formulation (parts by weight) | | | | | | | | | | |
| PP | | 70 | 77.8 | 56 | 56 | 56 | 56 | 56 | 62.2 | 62.2 |
| PE | | — | — | 14 | 14 | 12.5 | 12.5 | 11 | 15.6 | 13.9 |
| POE | | 20 | 22.2 | 20 | — | 21.5 | 18.5 | 17 | 22.2 | 20.6 |
| OBC | | — | — | — | 20 | — | 3 | 6 | — | 3.3 |
| Talc | | 10 | — | 10 | 10 | 10 | 10 | 10 | — | — |
| Properties | | | | | | | | | | |
| MFR | @230° C. 2.16 kg (g/10 min) | 11.6 | 13.6 | 9.1 | 7.6 | 9.0 | 7.6 | — | 10.8 | 10.6 |
| Flexural Modulus | MPa | 1088 | 793 | 764 | 799 | 788 | 788 | 750 | 703 | 662 |
| Tensile Modulus | MPa | 1050 | 767 | 833 | 830 | 832 | 815 | 804 | 692 | 727 |
| Yield Strength | MPa | 16.4 | 16.3 | 16.2 | 15.3 | 15.8 | 15.3 | 14.9 | 15.6 | 15.3 |
| Tensile Strain at Break | % | 480 | 505 | 502 | 561 | 541 | 639 | 681 | 504 | 623 |
| Notched Izod (RT) | KJ/m$^2$ | 53.7 | 50.5 | 56.0 | 56.7 | 57.0 | 56.0 | 55.6 | 51.9 | 52.1 |
| Notched Izod (0° C.) | KJ/m$^2$ | 49.1 | — | 55.0 | — | — | 58.9 | 58.6 | — | — |
| Notched Izod (−20° C.) | KJ/m$^2$ | 32.6 | 29.3 | 40.2 | 50.9 | — | 48.9 | 51.6 | 56.9 | 61.1 |
| Notched Izod (−30° C.) | KJ/m$^2$ | 9.6 | 11.1 | 8.3 | 44.9 | 9.4 | 20.7 | 26.2 | 49.1 | 54.8 |
| Notched Izod (−45° C.) | KJ/m$^2$ | — | 7.3 | — | — | — | — | — | 6.8 | 7.5 |

As seen from Table 1, it is clearly shown that, relative to the comparative examples, Working Examples 1-4 with OBC as compatibilizer/modifier surprisingly and unexpectedly showed significant improvement in the low temperature toughness. The flow properties and other mechanical properties, including flex and tensile modulus, are also very good with the addition of OBC.

What is claimed is:

1. A composition consisting of:
   (A) from 30 wt % to 70 wt % of a propylene component including at least one propylene based polymer having a propylene content of at least 70.0 wt %, based on the total weight of the propylene based polymer, and a melt flow rate from 1.0 g/10 min to 100.0 g/10 min (ASTM D-1238 at 230° C., 2.16 kg);
   (B) from 1 wt % to 20 wt % of an ethylene component including at least one ethylene based polymer having an ethylene content of at least 85.0 wt %, based on the total weight of the ethylene based polymer, a melt index from 0.1 g/10 min to 50.0 g/10 min (ASTM D-1238 at 190° C., 2.16 kg), and a density from 0.935 to 0.970 g/cc;
   (C) from 1 wt % to 40 wt % of an olefin block copolymer; and
at least one of (D) from 1 wt % to 40 wt % of a polyolefin elastomer and (E) from 1 wt % to 30 wt % of a filler.

2. The composition of claim 1, wherein the filler is talc.

3. The composition as claimed claim 1, wherein the olefin block copolymer has a density from 0.850 g/cc to 0.890 g/cc (ASTM D792) and a melt index from 0.1 g/10 min to 10.0 g/10 min (ASTM D-1238 at 190° C., 2.16 kg).

4. The composition as claimed in claim 1, wherein the polyolefin elastomer has a density from 0.850 g/cc g/cc to 0.890 g/cc (ASTM D792) and a melt index from 0.1 g/10 min to 30.0 g/10 min (ASTM D-1238 at 190° C., 2.16 kg).

5. The composition as claimed in claim 1, further comprising a melt flow rate of greater than 7.0 g/10 min at 230° C., 2.16 kg.

6. The composition as claimed in claim 1, further comprising a notched impact of greater than 45.0 kJ/m$^2$ at −20° C.

7. The composition as claimed in claim 1, further comprising a notched impact of greater than 20.0 kJ/m$^2$ at −30° C.

8. The composition as claimed in claim 1, further comprising a notched impact of greater than 7.0 kJ/m$^2$ at −45° C.

9. The composition as claimed in claim 1, further comprising a flexural modulus of greater than 650 MPa.

* * * * *